(Model.)

J. D. BUCKHOUT.
Furniture Caster.

No. 241,785.        Patented May 24, 1881.

Witnesses
John H. Folk

Inventor,
John D. Buckhout

UNITED STATES PATENT OFFICE.

JOHN D. BUCKHOUT, OF NEW YORK, N. Y.

FURNITURE-CASTER.

SPECIFICATION forming part of Letters Patent No. 241,785, dated May 24, 1881.

Application filed October 30, 1880. (Model.)

*To all whom it may concern:*

Be it known that I, JOHN D. BUCKHOUT, of the city, county, and State of New York, have invented certain Improvements in Swiveling Glass-Ball Casters, of which the following is a specification.

This invention relates to a new manner of constructing glass-ball casters so as to make them swivel and revolve, which is accomplished as shown in the accompanying drawings, in which—

Figure 1:
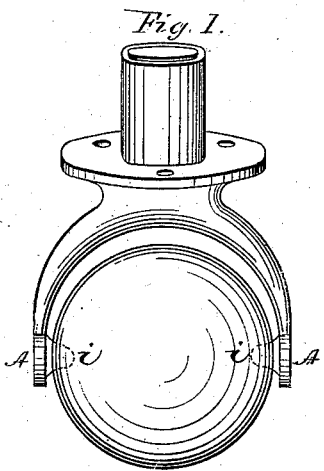
Figure 2:
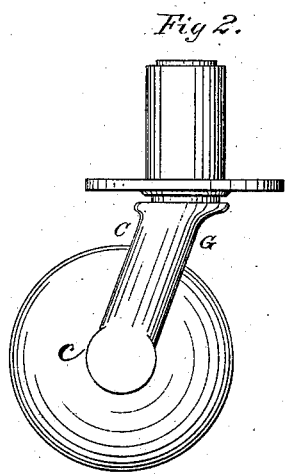
Figure 3:
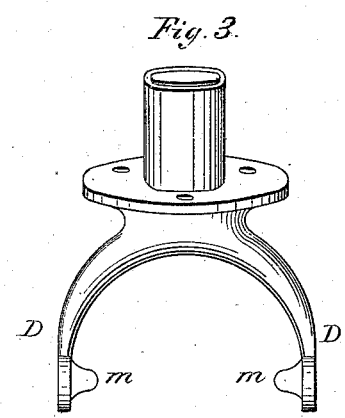

Figure 1 is a glass ball fitted with the sockets A A, the dotted lines $i$ $i$ indicating the bevel of same. Fig. 2 represents side view of frame or arch G, with offset $c$ $c$. Fig. 3 represents front view of arms D D, with pins $m$ $m$, the glass ball being removed.

I carry out my invention in the following manner: By constructing the glass ball with two indentations at opposite sides, the indentations being rounded or beveled at their outer edges, in order to prevent the chipping off the glass when fitted with the pivots, and making two bearing-arms in the form of an arch over the upper part of the glass ball, giving said arch an inclination or offset from the upright post or top of the caster. These bearing-arms are provided at their inner lower ends with cylindrical pins or pivots, which are intended to be fitted into the indentations in the glass ball, which will then turn upon these pivots as a bearing.

The upper part of the caster, above the arch, may be either a straight stem or shank, or a plate, socket, cup, or ring attachment for fitting the caster to furniture, all these modes of attachment being in common use in the ordinary styles of casters.

I am aware that a trunk-roller has been patented with conical half-journals intended to be pressed together to form an axle, and do not claim such construction; but I use a pivot in a novel combination with a glass ball as a necessary part of the construction. While the construction of the said trunk-roller is with half-journals, my construction uses eighth-journals, sixth-journals, or quarter-journals, according to the size of glass ball used.

I am also aware that prior to my invention glass-ball or ball casters have been made with straight depending arms terminating in circular plates intended to hold the ball by a clamping pressure, and do not claim or use such construction, as a caster with straight depending arms is practicable only in a roller that is not required to swivel or change direction automatically, and would not answer for a furniture-caster, especially a caster constructed in part of glass, as in changing direction or swiveling the casters would have to drag until they were moved by hand to bear in the new direction, or be wrenched around by the pressure exerted, with the effect of breaking the glass balls, for which reason I make an offset and do not use straight depending arms or side bearings.

Having thus described my invention, what I desire to claim and secure by Letters Patent is—

As a new article of manufacture, a glass ball fitted with two rounded edged indentations at opposite sides, into which fit cylindrical pivots, which pivots are at the inner lower ends of two bearing-arms, forming an arch over the upper part of the ball, said arch offsetting or inclining from the upright post or top of the caster, in order to allow the caster-frame to turn around or swivel when required, substantially as described.

JOHN D. BUCKHOUT.

Witnesses:
JOHN H. FOLK,
CLIFFORD SAVILLE.